United States Patent [19]

Kishida et al.

[11] 4,173,600
[45] Nov. 6, 1979

[54] MULTI-STAGE SEQUENTIALLY PRODUCED POLYMER COMPOSITION

[75] Inventors: Kazuo Kishida; Akira Hasegawa, both of Otake; Hiroshi Mohri, Yokohama, all of Japan

[73] Assignee: Mitsubishi Rayon Co., Limited, Tokyo, Japan

[21] Appl. No.: 963,733

[22] Filed: Nov. 27, 1978

Related U.S. Application Data

[63] Continuation-in-part of Ser. No. 807,642, Jun. 17, 1977, abandoned.

[30] Foreign Application Priority Data

Jun. 25, 1976 [JP] Japan ................................ 51/75302

[51] Int. Cl.$^2$ .......................................... C08F 279/02
[52] U.S. Cl. ..................................... 525/76; 428/519; 525/78; 525/84; 525/85
[58] Field of Search ........... 260/876 R, 876 B, 880 B, 260/892, 880 R; 528/516, 517, 519

[56] References Cited

U.S. PATENT DOCUMENTS 3,793,402  2/1974  Owens ............................. 260/876 R

*Primary Examiner*—Paul R. Michl
*Attorney, Agent, or Firm*—Oblon, Fisher, Spivak, McClelland & Maier

[57] ABSTRACT

A multi-stage sequentially produced polymer structure composition, comprising: an innermost layer (A), and successively seed polymerized thereupon an elastic polymer layer (B), an outermost layer (C) and at least one intermediate layer (D), said layer (A) which has a glass transition temperature (Tg) of at least 10° C. and which constitutes 5–35% by weight of the total polymer composition being the polymerized product of a monomer mixture comprising 51–100 parts by weight of styrene or a styrene derivative, 0–49 parts by weight of a monomer having a copolymerizable double bond, 0–10 parts by weight of a polyfunctional monomer, and 0–5 parts by weight of a graft crosslinking agent; said layer (B) which has a glass transition temperature of 0° C. or less and which constitutes 5–55% by weight of the total polymer composition being the product, polymerized in the presence of a product containing the previously polymerized stages, of a monomer mixture comprising 60–100 parts by weight of a diene monomer, 0–40 parts by weight of a monomer having a copolymerizable double bond, 0–10 parts by weight of a polyfunctional monomer and 0–5 parts by weight of a graft crosslinking agent; said layer (C) which has a glass transition temperature of at least 50° C. and which constitutes 10–70% by weight of the total polymer composition being the product, polymerized in the presence of a product containing the previously polymerized stages, of a monomer mixture comprising 51 = 100 parts by weight of styrene or a styrene derivative and 0–49 parts by weight of a monomer having a copolymerizable double bond; and said intermediate layer (D) which constitutes 5–45% by weight of the total polymer composition being the product, polymerized in the presence of a product containing the previously polymerized stages, of a monomer mixture comprising 20 to (Y-10) parts by weight of styrene or a styrene derivative, (Y-10) to 20 parts by weight of a diene monomer, 0–10 parts by weight of a polyfunctional monomer and 0–5 parts by weight of a graft crosslinking agent, wherein Y is the amount of diene monomer used in the formation of said layer (B).

12 Claims, No Drawings

MULTI-STAGE SEQUENTIALLY PRODUCED POLYMER COMPOSITION

CROSS-REFERENCE TO RELATED APPLICATIONS

This application is a Continuation-In-Part application of application Ser. No. 807,642, filed June 17, 1977 now abandoned.

BACKGROUND OF THE INVENTION

1. Field of the Invention

The present invention relates to a high impact polymer composition of excellent transparency and stress-whitening resistance characteristics. More particularly, this invention provides a resin composition which is excellently transparent, which has excellent gloss characteristics, which is not whitened by bending and which possesses excellent impact strength properties. The composition has a multi-layer structure comprising a rubber layer composed mainly of a diene monomer, hard inner and outer resin layers composed mainly of styrene, or the like, which are in contact with and sandwich the rubber layer and intermediate layers composed of a diene monomer and a hard resin layer component which are provided between the rubber layer and the inner resin layer and between the rubber layer and the outer resin layer.

2. Description of the Prior Art

Polystyrenes have been widely used as general-purpose resins because of their excellent transparency, water resistance and molding workability. However, because of their brittleness, which is one of the defects of polystyrenes, they have seldom been used in the preparation of films, sheets and the like.

Various methods have been attempted to overcome the brittleness of polystyrenes. In fact, styrene resins are available commercially for use in the manufacture of films and sheets which are high impact styrenes and there are biaxially oriented polystyrene films and sheets. However, the high impact styrenes are opaque because they are reinforced with rubber particles and are not suitable as wrapping films which must be transparent. The biaxially oriented films and sheets possess improved brittleness properties and also possess good transparency characteristics. However, they are still unsatisfactory as films or sheets because of their unacceptable bending strength, tear strength, and other properties. Moreover, involved preparative techniques and complicated equipment are required for the production of films and sheets from the available styrene materials.

U.S. Pat. No. 3,853,978 shows another attempt to employ polystyrenes for the fabrication of films and sheets which retain the good transparency characteristics of polystyrenes in which a styrene-butadiene tapered polymer is obtained by anionic polymerization of styrene thereby forming a transparent and high impact film or sheet. In this method polymers having a desired block structure are synthesized by strictly controlling the polymerization conditions of styrene and butadiene by a living anionic polymerization mechanism. That is, copolymers having a gradient composition are synthesized by gradually changing the styrene-butadiene chain mainly between styrene blocks and butadiene blocks. However, since this method is a complicated technique involving a living anionic polymerization mechanism, the monomers and solvents used must be of good quality and contain no oxygen or moisture. Furthermore, in this method the polymerization is effected in a hydrocarbon solvent such as benzene, n-hexane, or the like and the recovery of polymer from the polymerization solution must be accomplished by precipitating it in methanol, then isolating the polymer and vacuum drying it. Thus, the method requires extremely complicated steps and substantial investments in industrial equipment in comparison to the requirements of suspension polymerization and emulsion polymerization procedures which are used for the polymerization of ordinary sytrene resins.

In other approaches, suspension and emulsion polymerization procedures and the like, have been employed for the preparation of ABS resins for a long time. For example, in one method a hard resin layer composed mainly of styrene is provided as the nucleus of a diene elastic polymer in the preparation of a graft polymer in order to improve the impact resistance of the product prepared. The objective of all of these methods is to improve the impact strength of the product and hence a diene polymer which has a low Tg value is used as the nucleus and a monomer composed mainly of styrene or a mixture of styrene and acrylonitrile is added thereon and the polymerization reaction is conducted. Therefore, the resultant polymer possesses improved molding workability, but the excellent transparency inherent in polystyrene is lost and the molded product becomes opaque or translucent. Moreover, sheets of the product exhibit the so-called stress-whitening deficiency when they are bent and thus the product has substantial limitations when put to practical use.

It has further been proposed to form a layered product in which a hard resin such as styrene, methyl methacrylate, or the like is present in the nucleus of the product. U.S. Pat. No. 3,793,402 discloses a method of providing a high impact composition which has less haziness by forming a three-layer structure comprising a nucleus, an outer layer of resins of high Tg and an elastic polymer layer comprising a lower alkyl acrylate or butadiene between the nucleus and the outer layer or a multi-layer structure comprising repetitions of the three-layer structure while keeping the order of a hard resin→soft resin→hard resin and then blending the structure with polystyrene, polymethyl methacrylate, or the like. However, this composition has the defect common to many polymer blends such that when it is molded into a film, sheet or the like, whitening is apt to occur upon bending. Moreover, the transparency of the product is diminished in comparison to polystyrene or polymethyl methacrylate. In the multi-layer polymer per se, each layer is merely present as a block and consequently, the molded product is opaque or translucent. Furthermore, when the polymer product is molded into a film, limited molding conditions are operative and thus the polymer, in effect, can hardly be used as a suitable material for the preparation of films.

A need, therefore, continues to exist for a method of preparing styrene films and sheets and for general molding materials which possess excellent transparency properties and impact resistance properties and which do not exhibit stress whitening when molded into films or sheets and which are produced by an emulsion polymerization procedure which is advantageous from an industrial viewpoint.

SUMMARY OF THE INVENTION

Accordingly, one object of the present invention is to provide a multilayer polymer composition which possesses the excellent transparency characteristics of styrene and which has excellent impact resistance characteristics while possessing good resistance to stress whitening.

Another object of the present invention is to provide a method of preparing a multi-layer polymer composition which has excellent physical characteristics by an emulsion polymerization technique.

Briefly, these objects and other objects as hereinafter will become more readily apparent can be attained by a high impact composition of excellent transparency and stress-whitening characteristics which is produced by the emulsion polymerization of a layer (A) component and then successive polymerization reactions involving subsequent monomer mixtures in an aqueous medium in the presence of an emulsifier in a multi-stage procedure and which comprises an innermost polymer layer (A) composed of 100 parts by weight of a mixture of 51–100 parts by weight of styrene or a styrene derivative and 0–49 parts by weight of a monomer having a copolymerizable double bond, 0–10 parts by weight of a polyfunctional monomer and 0–5 parts by weight of a graft crosslinking agent which has a Tg of at least 10° C. and which constitutes 5–35% by weight of the total polymer composition; a central polymer layer (B) composed of 100 parts by weight of a mixture of 60–100 parts by weight of a diene monomer, 0–40 parts by weight of a monomer having a copolymerizable double bond, 0–10 parts by weight of a polyfunctional monomer and 0–5 parts by weight of a graft crosslinking agent which has a Tg of 0° C. or lower and which constitutes 5–55% of the total polymer composition; an outermost polymer layer (C) composed of 100 parts by weight of a mixture of 51–100 parts by weight of styrene or a styrene derivative and 0–49 parts by weight of a monomer having a copolymerizable double bond, which has a Tg of at least 50° C. and which constitutes 10–70% of the total polymer composition; and an intermediate polymer layer (D) composed of 100 parts by weight of a mixture of 20 to (Y-10) parts of styrene or a styrene derivative, (Y-10) to 20 parts by weight of a diene monomer, wherein Y is the amount of diene monomer used in the formation of said layer (B), 0–10 parts by weight of a polyfunctional monomer and 0–5 parts by weight of a graft crosslinking agent, which is provided between layer (A) and layer (B) and between layer (B) and layer (C), with the proviso that no intermediate layer (D) need be present between layer (A) and layer (B), which constitutes 5–45% of the total polymer composition, wherein the compositional ratio of styrene of a styrene derivative and the diene monomer (styrene or styrene derivative/diene monomer) gradually increases from the central polymer layer (B) towards the innermost polymer layer (A) and/or outermost polymer layer (C).

DETAILED DESCRIPTION OF THE PREFERRED EMBODIMENTS

The present technique of employing a multi-layer polymer structure wherein the compositional ratio of styrene or a styrene derivative and a diene monomer (styrene or styrene derivative/diene monomer) is gradually increased from the central rubber layer (B) towards the inner and outer layers as mentioned above and of intimately bonding the layers to each other with a polyfunctional monomer and a graft crosslinking agent has the advantage of preventing breakage of the layers caused by kneading in the molten state and a styrene polymer composition having excellent transparency characteristics and stress-whitening resistance can be obtained for the manufacture of films, sheets and the like.

Furthermore, when the multi-layer polymer of the present invention is blended with other thermoplastic resins such as polystyrene, acrylonitrile-styrene resin, and the like, the impact resistance and molding workability of the thermoplastic resins can be substantially improved.

The multi-layer structure polymer composition of this invention will now be explained in more detail.

The innermost layer polymer (A) is composed of 100 parts by weight of a mixture of 51–100 parts, preferably 70–100 parts by weight of styrene or a styrene derivative and 0–49 parts by weight of a monomer having a copolymerizable double bond, 0–10 parts by weight of a polyfunctional monomer and 0–5 parts by weight of a graft crosslinking agent. The layer has a Tg of at least 10° C. Suitable styrene derivatives include $\alpha$-methylstyrene, monochlorostyrene, t-butylstyrene, and the like, but the preferred use of styrene provides a composition of especially excellent gloss and moldability properties. Suitable examples of the monomers which have copolymerizable double bonds include alkyl methacrylates such as butyl methacrylate, propyl methacrylate, ethyl methacrylate, and methyl methacrylate; lower alkyl acrylates; acrylonitrile; methacrylonitrile; diene monomers such as butadiene, and the like. The content of the monomer in the polymer should be such that the polymer product does not lose its transparency. Suitable examples of the graft crosslinking agent include allyl, methallyl, and crotyl esters of a copolymerizable $\alpha,\beta$-unsaturated monocarboxylic acid or dicarboxylic acid. The allyl esters include those of acrylic acid, methacrylic acid, maleic acid, fumaric acid and itaconic acid and especially allyl methacrylate which has an excellent effect. Besides triallyl cyanurate, triallyl isocyanurate, and the like are also effective. The allyl, methallyl and crotyl groups possessed by these compounds are not conjugated and are of a lesser reactivity. Therefore, even after the completion of the polymerization reaction of a layer, these compounds remain in considerable amounts unreacted in the layer and therefore can effectively react in the formation of the next layer, thereby intimately bonding the two layers.

The amount of the graft crosslinking agent employed ranges from 0–5 parts, preferably 0.1–2 parts by weight per 100 parts by weight of the component (A). Preferably, not more than 5 parts by weight of the crosslinking agent is used because the elasticity of the product is adversely effected and the mechanical properties, especially the impact strength, are damaged.

Suitable examples of the polyfunctional momomer include polyvinylbenzenes such as divinylbenzene and trivinylbenzene; alkyleneglycol dimethyacrylates such as ethyleneglycol dimethacrylate and 1,3-butyleneglycol dimethacrylate; and alkyleneglycol diacrylates such as ethyleneglycol diacrylate and 1,3-butyleneglycol diacrylate. Divinylbenzene and 1,3-butyleneglycol dimethacrylate are especially preferred. These polyfunctional monomers are used in an amount of 0–10 parts, preferably 0.1–5 parts by weight per 100 parts by weight of component (A).

The mode of action of these copolymerizable polyfunctional monomers has not been theoretically proved, but it is believed that since each layer is partially crosslinked by the polyfunctional monomers, each layer is prevented from dissolving out into the monomer phase during formation of the subsequent layer and seed polymerization reactions proceed in a more preferred form. If the degree of crosslinking is high, the natural moldability of the final polymer substantially deteriorates and the maximum amount of the polyfunctional monomer is 5 parts.

The component (A) constitutes 5-35%, preferably 10-15% by weight of the total polymer composition.

After polymerization of the innermost layer polymer component (A), intermediate layers are successively polymerized so that the compositional ratio of styrene or a styrene derivative to the diene monomer gradually decreases until finally the central layer (B) is formed.

All of the intermediate layers contain 0-10 parts by weight of the polyfunctional monomer and 0-5 parts by weight of the graft crosslinking agent. Preferably, each layer is partially crosslinked and the layers are intimately graft bonded with each other.

The central rubber layer (B) constitutes 5-55% by weight of the total polymer composition and is composed of 100 parts by weight of a mixture of 60-100 parts by weight of a diene monomer, 0-40 parts by weight of a monomer having a copolymerizable double bond, 0-10 parts by weight of a polyfunctional monomer and 0-5 parts by weight of a graft crosslinking agent. The polymer component (B) per se is required to have a Tg of 0° C. or less, preferably −30° C. or less. Suitable diene monomers include butadiene, isoprene, chloroprene and 2,3-dimethylbutadiene. The same polyfunctional monomers and graft crosslinking agents which are used in the innermost polymer layer may also be used.

The central rubber layer (B) serves to impart elasticity to the multilayer polymer composition and constitutes 5-55%, preferably 15-50% by weight of the total polymer composition.

The composition of each layer intermediate between the layer (B) and the outermost layer (C) is important and it is necessary that the compositional ratio of styrene or a styrene derivative to the diene monomer gradually increases. That is, it is necessary that the composition in the layers does not abruptly change and that it increases at a nearly constant rate.

Each layer comprising styrene or a styrene derivative and a diene monomer is successively polymerized so that the above-mentioned composition is attained for the intermediate layers.

In this case, 0-10 parts by weight of polyfunctional monomer and 0-5 parts by weight of a graft crosslinking agent are used per 100 parts by weight of the intermediate layers as in the case of the intermediate layer between layer (A) and layer (B). It is preferred that the same kinds of styrene monomer, diene monomer, polyfunctional monomer and graft crosslinking agent are used in the intermediate layers between layers (A) and (B), the intermediate layers between layers (B) and (C) and component (C).

It is presumed that since each layer is effectively graft bonded to each layer in contact with it, the resulting polymer composition shows no stress-whitening and possesses excellent transparency regardless of the presence of a rubber component in considerable amount as blocks in the multi-layer structure.

It is necessary that at least one intermediate layer be present between layers (B) and (C). The intermediate layers between layers (A) and (B) preferably have the same layer arrangement as that between layers (B) and (C). However, for some uses of the final products, the number layers between layers (A) and (B) only may be reduced, and in some cases, layer (A) may be directly bonded to layer (B). In this case, a decrease in transparency and stress-whitening of the product must be prevented by adjusting the compositional ratio of styrene or styrene derivative to the diene monomer in the intermediate layers between layers (B) and (C). It is necessary that the intermediate layers constitute 5-45%, preferably 10-30% by weight of the total polymer composition.

In this case, it is preferable to use at least one intermediate layer between layer (A) and layer (B) or between layer (B) and layer (C) which gives excellent solid state properties. Furthermore, when a single intermediate layer is used it is preferable that it have a Tg intermediate between the Tg of layer (B) and that of layer (C).

In the practice of the present invention, it is necessary that not more than 90% of the amount of diene monomer used in the formation of layer (B) be used for the formation of the intermediate layers because the resulting polymer composition shows excellent moldability and stres-whitening characteristics. If the amount of diene monomer used for the formation of the intermediate layers is more than 90% of the amount of diene monomer used in the formation of layer (B), the beneficial effect of the intermediate layers becomes less. Similary, it is also necessary that the amount of diene monomer in the intermediate layers be at least 20 parts by weight.

The properties of the resulting polymer composition are shown in Example 4.

Accordingly, the monomer component for the formation of the intermediate layer (D) consists of 20 to (Y-10) parts by weight of styrene or a styrene derivative, (Y-10) to 20 parts by weight of a diene monomer, 0-10 parts by weight of a polyfunctional monomer and 0-5 parts by weight of a graft cross-linking agent, wherein Y denotes the amount of diene monomer used in the formation of layer (B).

The outermost layer (C) is composed of 100 parts by weight of a mixture of 51-100 parts by weight of styrene or a styrene derivative, preferably sytrene and 0-49 parts by weight of a monomer having a copolymerizable double bond and it is necessary that the Tg of the layer (C) per se be at least 50° C. Preferably, the polymerization degree of layer (C) is adjusted with a chain transfer agent or the like and the polymer preferably has a viscosity-average molecular weight of 50,000-1,000,000.

The styrene monomer and the monomer having a copolymerizable double bond which are used in layer (C) and the same as those used in layer (A).

Generally, if the product has an increased amount of layer (C) the moldability of the multi-layer polymer structure becomes better. If the amount of layer (C) is less than 10%, good molded products cannot be obtained, and if the amount is more than 70%, the effect of the intermediate layers on the total polymer decreases and the transparency and stress-whitening resistance characteristics deteriorate.

The polymer composition of this invention can be easily obtained by a multi-stage successive polymerization method using ordinary emulsion polymerization procedures. The multi-stage successive polymerization is effected under such conditions that the monomers which are successively added to an aqueous dispersion or emulsion are successively seed polymerized onto emulsion particles which are formed from the monomers which have been previously added and polymerized. It is necessary, however, that no polymer particles form during the polymerization process.

The desired thermoplastic polymer composition of this invention can be produced by effecting polymerization of each layer by the addition of a monomer blend of given composition after completion of the polymerization of the previous stage and the successive completion of polymerization of each added monomer blend.

However, in the above method the polymerization of the central rubber layer (B) and the intermediate layers between layers (B) and (C) may also be conducted as described below because of the fact that the polymerization rate of the diene monomers is extremely slow.

As described in "Handbook of Synthetic Rubber", Fourth Edition, page 172, published by Asakura Shoten in 1968, the polymerization rate of butadiene is very slow and its copolymerization rate with styrene is even slower in the presence of increasing amounts of butadiene. Therefore, if the polymerization of the components of layer (B) and the intermediate layers between layers (B) and (C) is completed one by one, a very long time is required for obtaining the total polymer composition and this is very disadvantageous from an industrial viewpoint.

Therefore, the total amount of butadiene necessary in the polymers of central rubber layer (B) and the intermediate layers between layers (B) and (C) is added to the polymerization mixture when the monomer blend is charged for the central rubber layer (B). Then, upon completion of polymerization of butadiene in the desired amount for the formation of layer (B), only styrene need be added to the solution so that the ratio of styrene or styrene derivative to diene necessary for the formation of the first intermediate layer is attained. After completion of polymerization of the styrene-butadiene copolymer to the extent desired for the formation of the first stage intermediate layer, styrene is further added to the solution so that the desired ratio of styrene derivative to diene necessary for the second stage intermediate layer is present.

It is possible to complete the polymerization of the central rubber layer (B) and the intermediate layers between layers (B) and (C) by repeating the above described process.

The completion of the polymerization of layer (B) and each intermediate stage layer between layers (B) and (C), i.e., the time at which the styrene component for the next stage of polymerization is to be added can be determined by assumptions drawn from the results of measuring the time-conversion of individual polymerization reactions which have been previously completed under the same conditions or by successively analyzing each layer composition of the actual system.

On the other hand, the intermediate layers between the innermost layer (A) and the central rubber layer (B) can also be formed such that the compositions of the layers exhibit gradually decreasing amounts of styrene from layer (A) towards layer (B) by applying the polymerization method to the intermediate layers between layers (B) and (C). That is, the total amount of styrene required for the polymers of the innermost layer (A) and the intermediate layers between layers (A) and (B) is added when the monomers are charged to the solution for the formation of the innermost layer (A). Then, when the polymerization of styrene is conducted until the desired amount of styrene is present in layer (A), butadiene is added along so that the ratio of styrene compound to diene for the subsequent polymerization of the first stage intermediate layer is obtained and after progress of the polymerization of the styrene-butadiene copolymer system to the extent desired for the first stage intermediate layer, butadiene is further added to the system to achieve a styrene compound-diene ratio suitable for the second stage intermediate layer.

It is possible to complete the polymerization of the innermost layer (A) and the intermediate layers between layers (A) and (B) by repeating the above procedure.

In the polymerization reactions of the intermediate layers between layers (A) and (B) and between layers (B) and (C), the foregoing description has been presented in terms of styrene and butadiene as monomers, but the same method may be applied to combinations of the other monomers previously described as components of each layer.

By using the above-described technique, the entire sequence of polymerization reactions for producing the polymer composition of this invention can be completed in an extremely short time.

By blending the multi-layer polymer structure of this invention with other thermoplastic resins, the molding workability and impact strength of the other thermoplastic resins can be substantially improved. Suitable examples of thermoplastic resins include vinyl polymers such as polypropylene, polystyrene, acrylonitrile-styrene copolymer, polymethyl methacrylate, polyvinyl chloride, polyvinylidene chloride, and the like; polycarbonates, thermoplastic polyesters, polyamides and the like.

In practicing this invention, the type of water soluble persulfates and redox initiators used as polymerization initiators are not critical as long as the polymerization reaction can proceed uninhibited until the final stage. The amount of emulsifier employed preferably ranges up to 5% of the total monomer content used in all stages of polymerization and the preferred emulsifier is an ordinary anionic surfactant, but there is no special limitation in its kind.

The multi-stage successive polymer composition obtained by the present process is coagulated by the usual salting out method, dried, then shaped in the conventional manner by the usual extruder and subjected to molding.

The conventional light stabilizers, oxidation stabilizers, fillers, coloring agents and the like may be added to the various stages of the successive polymerized layers, if desired.

Having generally described this invention, a further understanding can be obtained by reference to certain specific examples which are provided herein for purposes of illustration only and are not intended to be limiting unless otherwise specified.

The compounds and their abbreviations used in the following examples are as follows:

| | |
|---|---|
| Styrene | St |
| α-Methylstyrene | α-MSt |
| Butadiene | Bd |
| Isoprene | Ip |
| Chloroprene | Cp |

-continued

| | |
|---|---|
| Allyl methacrylate | AMA |
| Triallyl cyanurate | TAC |
| Triallylisocyanurate | TAIC |
| Divinylbenzene | DVB |
| 1,3-Butylene dimethacrylate | BD |
| Cumene hydroperoxide | CHP |
| n-Octyl mercaptan | n-OSH |

EXAMPLE 1

200 parts of deionized water, 1.2 parts of a soap of the potassium salt of a fatty acid produced by Nihon Yushi K. K., 0.003 part of ferrous sulfate ($FeSO_4.7H_2O$), 0.3 part of sodium pyrophosphate and 0.4 part of grape sugar were charged into an autoclave provided with a reflux condenser, a temperature sensor, a pressure indicator, air and gas blowing inlets, a diene monomer supplying inlet, a styrene monomer supplying inlet, a catalyst supplying inlet, a heating and cooling jacket and a stirrer and the contents of the reactor were stirred under a nitrogen gas stream. Then, 10 parts of St, 0.3 part of DVB, 0.1 part of AMA and 0.1% of CHP based on the total amount of the monomers were added thereto (0.1% of CHP was also added to all monomers added in the subsequent stages of polymerization.)

After filling and closing the autoclave, and while the contents were stirred at 120 rpm, layer (A) was polymerized by elevating the temperature to 55° C. After completion of polymerization of layer (A), successively 9 parts of St, 6 parts of Bd, and 0.01 part of DVB were added to the reaction medium and stirring was effected at 55° C. to complete the polymerization. Consecutively, the components of the third layer comprising 6 parts of St, 9 parts of Bd, and 0.01 part of DVB were added to the reaction medium and the solution components were polymerized.

Then, the components of the fourth layer component comprising 15 parts of Bd and 0.01 part of DVB were added to the reaction medium and polymerization of the central rubber layer (B) was completed while keeping the temperature at a level of 55° C.

Furthermore, the components of the fifth layer comprising 6 parts of St, 9 parts of Bd and 0.01 part of DVB and the sixth layer comprising 9 parts of St, 6 parts of Bd and 0.01 part of DVB were successively polymerized in the same manner as mentioned above. Thereafter, the outermost layer (C) comprising 15 parts of St and 0.03 part of n-OSH was added in 10 minutes and polymerized whereby a multi-layer structure polymer composition comprising seven layers was obtained, Sample (1).

It was confirmed by observation of the sample after completion of polymerization of each layer by an electron microscope that no new particles were produced during polymerization of each successive layer and complete seed polymerization was accomplished.

To the resultant emulsion was added sulfuric acid in an amount of 0.3% based on the total amount of polymer in the emulsion and the reaction medium contents were subjected to coagulation by heating and stirring the solution and then the polymer obtained was filtered, washed with water and dried to obtain a dry powder product.

Samples (2)–(5) as shown in Table 1 were prepared in the same manner as sample (1) except that the ratio of monomers in each layer and the amounts of the polyfunctional monomers and graft crosslinking agents were changed. Moreover, comparative samples (a), (b) and (c) as shown in Table 1 were prepared.

Comparative sample (a) is a copolymer comprising 70 parts of St, 30 parts of Bd and 0.3 part of n—OSH. Comparative sample (b) is a block copolymer of the so-called sandwich structure and comparative sample (c) has a rubber layer as an innermost layer. The polymer compositions thus obtained were shaped by a 25 φ extruder (screw L/D=24). The moldability of the polymers obtained, the transparency of the pellets obtained and the bending whitening characteristics of the strands are shown in Table 1.

Table 1

Effects of Intermediate Layers on Multi-Layer Structure Polymer Compositions

| Compositions of Charge | Structures of Polymer | | | | | | |
|---|---|---|---|---|---|---|---|
| | S/B/DVB/AMA | S/B/DVB | S/B/DVB | S/B/DVB | S/B/DVB | S/B/DVB | S/B |
| Sample (1) | 10/0/0.3/0.1 | 9/6/0.01 | 6/9/0.01 | 0/15/0.01 | 6/9/0.01 | 9/6/0.01 | 15/0 |
| Sample (2) | 10/0/0.3/0.1 | 10/5/0.1 | 0/15/0.01 | 5/10/0.01 | 5/5/0.007 | 10/5/0.1 | 20/0 |
| Sample (3) | 20/0/0.6/0.1 | 10/10/0.013 | 0/20/0.013 | 40/0/0 | | | |
| Sample (4) | 20/0/0.6/0.1 | 0/20/0.013 | 10/10/0.013 | 40/0/0 | | | |
| Sample (5) | 20/0/0.6/0.1 | 10/10/0.013 | 0/15/0.01 | 10/10/0.013 | 25/0/0 | | |
| Comparative Sample (a) | 70/30 | | | | | | |
| Comparative Sample (b) | 35/0 | 0/30 | 35/0 | | | | |
| Comparative Sample (c) | 0/15 | 5/10 | 10/10 | 10/5 | 35/0 | | |

Notes:
S = St and B = Bd
The symbols "⊚", "O", and "X" mean "Excellent", "Good", "Fairly Good" and "Poor".
Tensile strength and elongation: Thickness of film = about 100μm and pulling speed = 100%/min (JIS Z-1702)
Tear strength: According to Elemendorf method; Notch = 2 mm (JIS P-8116)
Folding endurance: MIT type testing machine; Test piece 150 × 15 (mm); power 1 kg tension; 175 times/min (JIS P-8115-1963)
Transparency of pressed plate: Sphere hazeometer (ASTM D 1003-61)
*0.03 part of n-OSH was present in the outermost layer of the samples of this invention.

| 25 φ Extrusion Characteristics | | | Tensile Strength and Elongation | | Tear Strength (kg/cm) | Folding Endurance (Times) | Transparency of Pressed Plate (Haze %) |
|---|---|---|---|---|---|---|---|
| Moldability | Transparency | Bending Whitening | λ B (kg/cm²) | ε B (%) | | | |
| ⊚ | ⊚ | ⊚ | 250 | 518 | 16.4 | 10000 | 5.1 |
| ⊚ | ⊚ | ⊚ | 248 | 496 | 15.9 | 10000 | 5.2 |
| O | Δ | O | 266.0 | 310 | 8.8 | 10000 | 14.5 |
| O | Δ | O | 257.4 | 305 | 9.6 | 4500 | 13.9 |
| O | O | O | 239 | 454 | 14.3 | 7900 | 10.8 |
| X | O | X | Molding into sheet was impossible | | — | — | 12.4 |
| X | X | X | Molding into sheet was impossible | | — | — | 57.0 |

Table 1-continued

Effects of Intermediate Layers on Multi-Layer Structure Polymer Compositions

| Δ | Δ | X | 175.2 | 27 | 4.1 | 1600 | 38.1 |

Furthermore, pellets of each sample were sufficiently dried and then molded into a sheet of about 100 μm in thickness by a T-die of 10 cm in width at a drawing speed of 10 m/min and the characteristics of the film were examined.

In the Table, the column heading "Transparency of Pressed Plate" indicates the evaluation of the transparency of a molded plate obtained by press molding of powders before extrusion molding by a haze meter.

EXAMPLE 2

Multi-layer polymer structure compositions were prepared in the same manner as described for the preparation of sample (1) of Example 1 except that the kinds and amounts of graft crosslinking agent and polyfunctional monomers added to each layer were varied as shown in Table 2. Thus, dry powders obtained were shaped by a 25 φ extruder and the moldability, transparency and stress-whitening characteristics of the product were examined and the results obtained are shown in Table 2. Moreover, the transparency of the molded plate obtained by press molding is also shown in Table 2.

tion of central rubber layer (B) and the intermediate layers between layers (B) and (C) were effected in the following manner. That is, after completion of polymerization of the innermost layer (A), 30 parts of Bd which were the total amount required for layer (B) and the intermediate layers between layers (B) and (C) and 0.1% of CHP based on the amount of Bd was added for the formation of layer (B) and the intermediate layers between layers (B) and (C).

The various monomer mixtures for each layer were stirred at 55° C. for 4.0 hours continuously after the polymerization of layer (A). (The amount of monomers remaining at this time was measured by gas chromatography and it was found that 10 parts of Bd remained. That is, the extent of conversion of Bd was 66%.)

At that time, 10 parts of styrene which were required for the intermediate layer between layers (B) and (C) were added and stirred at 55° C. for 4 hours to complete the polymerization of the intermediate layer between layers (B) and (C).

The extrusion characteristics of the thus obtained multi-layer polymer structure were completely the same as those of sample (4) of Example 1.

Table 2

|  |  | S/B 10/0 | S/B 9/6 | S/B 6/9 | S/B 0/15 | S/B 6/9 | S/B 9/6 | S/B 15/0 |
|---|---|---|---|---|---|---|---|---|
| Sample (6) | DVB/AMA | 0/0 | 0/0 | 0/0 | 0/0 | 0/0 | 0/0 | — |
| Sample (7) | DVB/AMA | 0.02/0 | 0/0 | 0/0 | 0/0 | 0/0 | 0/0 | — |
| Sample (8) | DVB/AMA | 0.5/0 | 0/0 | 0/0 | 0/0 | 0/0 | 0/0 | — |
| Sample (9) | DVB/AMA | 0.3/0 | 0.1/0 | 0.1/0 | 0.1/0 | 0.1/0 | 0.1/0 | — |
| Sample (10) | DVB/AMA | 0.3/0 | 0/0 | 0/0 | 0.5/0 | 0/0 | 0/0 | — |
| Sample (11) | DVB/AMA | 0/0.02 | 0/0 | 0/0 | 0/0 | 0/0 | 0/0 | — |
| Sample (12) | DVB/AMA | 0/0.5 | 0/0 | 0/0 | 0/0 | 0/0 | 0/0 | — |
| Sample (13) | DVB/AMA | 0/0.2 | 0/0.1 | 0/0.1 | 0/0.1 | 0/0.1 | 0/0.1 | — |
| Sample (14) | DVB/AMA | 0.3/0.1 | 0.3/0.1 | 0.3/0.1 | 0.3/0.1 | 0.3/0.1 | 0.3/0.1 | — |
| Sample (15) | DVB/TAC | 0.3/0.1 | 0.3/0.1 | 0.3/0.1 | 0.3/0.1 | 0.3/0.1 | 0.3/0.1 | — |
| Sample (16) | BD/TAC | 0.3/0.1 | 0.3/0.1 | 0.3/0.1 | 0.3/0.1 | 0.3/0.1 | 0.3/0.1 | — |
| Sample (17) | BD/TAIC | 0.3/0.1 | 0.3/0.1 | 0.3/0.1 | 0.3/0.1 | 0.30.1 | 0.3/0.1 | — |
| Comparative Sample (d) | DVB/AMA | 2.0/0 | 0/0 | 0/0 | 0/0 | 0/0 | 0/0 | — |
| Comparative Sample (e) | DVB/AMA | 0/20 | 0/0 | 0/0 | 0/0 | 0/0 | 0/0 | — |
| Comparative Sample (f) | DVB/AMA | 0/0 | 0/0 | ·0/0 | 2.0/0 | 0/0 | 0/0 | — |
| Comparative Sample (g) | DVB/AMA | 0/0 | 0/0 | 0/0 | 0/2.0 | 0/0 | 0/0 | — |

| 25 φ Extrusion Characteristics | | | Tensile Strength and Elongation | | Tear Strength (kg/cm) | Folding Endurance (Times) | Transparency of Pressed Plate (Haze %) |
|---|---|---|---|---|---|---|---|
| Moldability | Transparency | Stress Whitening | λ B (kg/cm$^2$) | ε B (%) | | | |
| ○ | ○ | ○ | 241.7 | 485 | 10.2 | 8,800 | 9.7 |
| ○ | ○ | ○ | 243.9 | 492 | 11.5 | 8,700 | 8.9 |
| ○ | ○ | ○ | 252.1 | 471 | 10.6 | 9,000 | 8.6 |
| ◎ | ◎ | ◎ | 251.4 | 492 | 14.7 | >10,000 | 5.6 |
| ◎ | ○ | ○ | 242.7 | 499 | 10.6 | 9,200 | 8.8 |
| ○ | ◎ | ○ | 240.0 | 481 | 10.0 | 8,900 | 8.7 |
| ○ | ◎ | ○ | 242.6 | 480 | 11.4 | 9,000 | 7.3 |
| ○ | ◎ | ◎ | 253.2 | 524 | 14.9 | >10,000 | 5.2 |
| ◎ | ◎ | ◎ | 258.4 | 545 | 15.7 | >10,000 | 4.8 |
| ◎ | ○ | ◎ | 250.1 | 501 | 14.6 | >10,000 | 8.6 |
| ◎ | ○ | ◎ | 247.2 | 489 | 15.6 | >10,000 | 8.3 |
| ◎ | ○ | ◎ | 254.9 | 532 | 15.7 | >10,000 | 8.5 |
| X | X | X | 124.3 | 103 | 4.2 | 150 | 37.4 |
| X | Δ | Δ | 157.4 | 120 | 4.0 | 2,200 | 29.6 |
| X | X | X | 113.5 | 96 | 2.5 | 240 | 38.5 |
| X | Δ | Δ | 132.1 | 159 | 2.6 | 3,800 | 28.8 |

EXAMPLE 3

Multi-layer polymer structures were prepared in the same manner as described in the preparative procedure of sample (4) of Example 1 except that the polymeriza-

EXAMPLE 4

Multi-layer polymer structures were prepared in the same manner as described in the preparative procedures of sample (4) of Example 1 as shown in Table 3.

In Table 3, the amount of diene monomer used in the formation of the third layer of sample (18) is 90% of the amount of diene monomer used in the formation of the second layer. Furthermore, the amount of diene monomer used in the formation of the third layer of sample (19) is 20% of the amount of diene monomer used in the formation of the second layer.

As can be observed from Table 3, the multi-layer polymer structure within the scope of the present invention gives excellent solid state properties in comparison with comparative samples (h) and (i).

Table 3

|  | S/B/DVB/AMA | S/B/DVB | S/B/DVB | S/B/DVB | 25 φ Extrusion Characteristics | | Tensile Strength & Elongation | | Tear Strength (kg/cm) | Folding Endurance (Times) |
| --- | --- | --- | --- | --- | --- | --- | --- | --- | --- | --- |
|  |  |  |  |  | Molda-bility | Bending Whitening | λ B (kg/cm²) | ε B (%) |  |  |
| Sample (18) | 20/0/0.6/0.1 | 0/20/0.013 | 2/18/0.013 | 40/0/0 | Δ | Δ | 200 | 125 | 5.4 | 1800 |
| Sample (19) | 20/0/0.6/0.1 | 0/20/0.013 | 6/14/0.013 | 40/0/0 | 0 | 0 | 240 | 280 | 11.0 | 7000 |
| Sample (20) | 20/0/0.6/0.1 | 0/20/0.013 | 12/8/0.013 | 40/0/0 | 0 | 0 | 250 | 310 | 7.2 | 4000 |
| Sample (21) | 20/0/0.6/0.1 | 0/20/0.013 | 16/4/0.013 | 40/0/0 | Δ | Δ | 270 | 150 | 6.8 | 1500 |
| Comparative Sample (h) | 20/0/0.6/0.1 | 0/20/0.013 | 0/20/0.013 | 40/0/0 | Δ | X | — | — | — | — |
| Comparative Sample (i) | 20/0/0.6/0.1 | 0/20/0.013 | 20/0/0.013 | 40/0/0 | X | X | — | — | — | — |

EXAMPLE 5

Dry powders of the multi-layer polymer structure of sample (1) in Example 1 were blended with other thermoplastic compositions as shown in Table 4 and each blend was molded by a 25 φ molding machine. The impact strength of the molded products is shown in Table 4.

Table 4

|  | Thermoplastic Resin | (parts) | Amount of the Multilayer Polymer of the Present Invention (parts) | Impact Strength :1 (IZod) | Impact Strength When No Multilayer Polymer Was Added (IZod) |
| --- | --- | --- | --- | --- | --- |
| Sample (22) | Polypropylene | 80 | 20 | 13.3 | 5.6 |
| Sample (23) | Polystyrene | 80 | 20 | 10.5 | 1.2 |
| Sample (24) | Polystyrene | 60 | 40 | 12.8 |  |
| Sample (25) | A S Resin | 80 | 20 | 14.5 | 2.6 |
| Sample (26) | A S Resin | 60 | 40 | 19.2 |  |
| Sample (27) | PMMA | 80 | 20 | 9.5 | 1.8 |
| Sample (28) | PVC (polyvinyl chloride) | 80 | 20 | 26.3 | 3.0 |
| Sample (29) | PC (polycarbonate) | 80 | 20 | 64.6 | 19.5 |
| Sample (30) | Polyester | 80 | 20 | 19.8 | 12.2 |

*1 Izod impact strength (kg-cm/cm) according to ASTM-D-256

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A multi-stage sequentially produced polymer structure composition, which comprises:
   an innermost layer (A), and successively seed polymerized thereupon an elastic polymer layer (B), an outermost layer (C) and at least one intermediate layer (D);
   said layer (A) which has a glass transition temperature (Tg) of at least 10° C. and which constitutes 5-35% by weight of the total polymer composition being the polymerized product of a monomer mixture comprising 51-100 parts by weight of styrene or a styrene derivative, 0-49 parts by weight of a monomer having a copolymerizable double bond, 0-10 parts by weight of a polyfunctional monomer, and 0-5 parts by weight of a graft crosslinking agent;
   said layer (B) which has a glass transition temperature of 0° C. or less and which constitutes 5-55% by weight of the total polymer composition being the product, polymerized in the presence of a product containing the previously polymerized stages, of a monomer mixture comprising 60-100 parts by weight of a diene monomer, 0-40 parts by weight of a monomer having a copolymerizable double bond, 0-10 parts by weight of a polyfunctional monomer and 0-5 parts by weight of a graft crosslinking agent;
   said layer (C) which has a glass transition temperature of at least 50° C. and which constitutes 10-70% by weight of the total polymer composition being the product, polymerized in the presence of a product containing the previously polymerized stages, of a monomer mixture comprising 51-100 parts by weight of styrene or a styrene derivative and 0-49 parts by weight of a monomer having a copolymerizable double bond; and
   said intermediate layer (D) which constitutes 5-45% by weight of the total polymer composition being the product, polymerized in the presence of a product containing the previously polymerized stages, of a monomer mixture comprising 20 to (Y-10) parts by weight of styrene or a styrene derivative, (Y-10) to 20 parts by weight of a diene monomer, 0-10 parts by weight of a polyfunctional monomer and 0-5 parts by weight of a graft crosslinking agent, wherein Y is the amount of diene monomer used in the formation of said layer (B).

2. The polymer composition of claim 1, wherein at least one of said intermediate layers (D) is present between the (B) and (C) layers and the styrene or styrene derivative content of the intermediate layers (D) increases linearly from the (B) layer toward the layer (C).

3. The polymer composition of claim 1, wherein at least one of said intermediate layers (D) is present between the (A) and (B) layers and between the (B) and (C) layers and the styrene or styrene derivative content of the intermediate layers (D) increases linearly from the (B) layers toward both the (A) and (C) layers.

4. A method for producing a multi-stage sequentially produced polymer structure of a composition comprising an innermost layer (A), and successively seed polymerized thereupon an elastic polymer layer (B), an outermost layer (C) and at least one intermediate layer (D);

said layer (A) which has a glass transition temperature (Tg) of at least 10° C. and which constitutes 5–35% by weight of the total polymer composition being the polymerized product of a monomer mixture comprising 51–100 parts by weight of styrene or a styrene derivative, 0–49 parts by weight of a monomer having a copolymerizable double bond, 0–10 parts by weight of a polyfunctional monomer, and 0–5 parts by weight of a graft crosslinking agent;

said layer (B) which has a glass transition temperature of 0° C. or less and which constitutes 5–55% by weight of the total polymer composition being the product, polymerized in the presence of a product containing the previously polymerized stages, of a monomer mixture comprising 60–100 parts by weight of a diene monomer, 0–40 parts by weight of a monomer having a copolymerizable double bond, 0–10 parts by weight of a polyfunctional monomer and 0–5 parts by weight of a graft crosslinking agent;

said layer (C) which has a glass transition temperature of at least 50° C. and which constitutes 10–70% by weight of the total polymer composition being the product, polymerized in the presence of a product containing the previously polymerized stages, of a monomer mixture comprising 51–100 parts by weight of styrene or a styrene derivative and 0–49 parts by weight of a monomer having a copolymerizable double bond; and said intermediate layer (D) which constitutes 5–45% by weight of the total polymer composition being the product, polymerized in the presence of a product containing the previously polymerized stages, of a monomer mixture comprising 20 to (Y-10) parts by weight of styrene or a styrene derivative, (Y-10) to 20 parts by weight of a diene monomer, 0–10 parts by weight of a polyfunctional monomer and 0–5 parts by weight of a graft crosslinking agent, wherein Y is the amount of diene monomer used in the formation of said layer (B), which comprises the steps of:

(i) emulsion polymerizing the monomer mixture which constitutes layer (A) in an aqueous medium in the presence of an emulsifier and a polymerization initiator whereby particles of polymer are produced;

(ii) adding the monomer mixture which constitutes layer (B) to the aqueous dispersion obtained from step (i) and then seed polymerizing the monomer constituents of the aqueous medium onto the particles from the previous step;

(iii) adding styrene or a styrene derivative and a diene monomer to the aqueous dispersion obtained from step (ii) while gradually changing the composition so that the ratio of styrene or a styrene derivative/diene monomer changes from the ratio in layer (B) to the ratio of layer (C) and substantially seed polymerizing the monomer constituents of the solution onto the particles from the previous step; and (iv) adding the monomer mixture which constitutes outermost layer (C) to the aqueous dispersion from step (iii) and seed polymerizing the monomer constituents of the solution onto the particles from the previous step.

5. The method of claim 3, wherein at least one of said intermediate layers (D) is present between the (B) and (C) layers and the styrene or styrene derivative content of the intermediate layers (D) increases linearly from the (B) layer toward the (C) layer.

6. The method of claim 3, wherein at least one of said intermediate layers (D) is present between the (A) and (B) layers and between the (B) and (C) layers and the styrene or styrene derivative content of the intermediate layers (D) increases linearly from the (B) layer toward both the (A) and (C) layers.

7. The method of claim 4, wherein in step (iii), styrene or a styrene derivative and a diene monomer are added to the aqueous dispersion from step (ii) in a blending ratio of styrene or styrene derivative to diene monomer which increases stage by stage and wherein the monomer mixture of each stage is successively polymerized.

8. The method of claim 4, which further comprises, prior to step (ii), adding styrene or a styrene derivative and a diene monomer to the aqueous dispersion obtained from step (i) while gradually changing the composition of the dispersion in a step-by-step fashion such that the ratio of styrene of styrene derivative to diene monomer changes from the ratio of layer (A) to the ratio of layer (B) and substantially seed polymerizing the monomer mixture onto the particles from the previous step after each change in composition.

9. The method of claim 4, which further comprises, prior to step (ii), successively adding styrene or a styrene derivative and a diene monomer after the polymerization of step (i) in a bending ratio of styrene or styrene derivative to diene monomer which decreases stage by stage and substantially seed polymerizing the monomer mixture of each successive stage onto the particles from the previous step, and wherein in step (iii) styrene or a styrene derivative and a diene monomer are added to the aqueous dispersion obtained from step (ii) in a blending ratio of styrene or styrene derivative to diene monomer which increases stage by stage and wherein the monomer mixture of each successive stage is substantially seed polymerized onto the particles from the previous step.

10. The method of claim 4, wherein 0.1–5 parts of a graft crosslinking agent is present as an essential component in the monomer mixture of at least one of said intermediate layers present between layers (A) and (B) and between layers (B) and (C) and said graft crosslinking agent is allowed to bond with the monomer mixture of the subsequent polymerization step.

11. The method of claim 4, wherein 0.1–10 parts of a polyfunctional monomer is present as an essential component in the monomer mixtures of layers (A) and (B)

and at least one of said intermediate layers present between layers (A) and (B) and between layers (B) and (C) and wherein the monomer mixture of each stage is seed polymerized onto the particles from the previous step.

12. A resin composition which comprises: 1–99% by weight of the multistage sequentially produced polymer structure composition of claim 1 in admixture with 99–1% by weight of at least one thermoplastic polymer selected from the group consisting of homo or copolymers of the formula

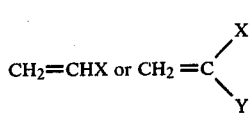

wherein X is H, $CH_3$, Cl, F, Br, $COOCH_3$, CN, $OCOCH_3$, $C_6H_5$ or alkoxy and Y is H, $CH_3$, Cl, F or Br, polycarbonates, polyesters and polyamides.

* * * * *